(12) United States Patent
Madala et al.

(10) Patent No.: US 12,235,970 B2
(45) Date of Patent: Feb. 25, 2025

(54) SYSTEMS AND METHODS FOR AGGREGATED VULNERABILITY PROOFING OF AN IHS

(71) Applicant: Dell Products, L.P., Round Rock, TX (US)

(72) Inventors: Raveendra Babu Madala, Bangalore (IN); Santosh Gore, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 335 days.

(21) Appl. No.: 18/048,538

(22) Filed: Oct. 21, 2022

(65) Prior Publication Data

US 2024/0135002 A1  Apr. 25, 2024
US 2024/0232379 A9  Jul. 11, 2024

(51) Int. Cl.
*G06F 21/57* (2013.01)

(52) U.S. Cl.
CPC .......... *G06F 21/577* (2013.01); *G06F 21/575* (2013.01)

(58) Field of Classification Search
CPC . G06F 21/577; G06F 21/575; G06F 2221/034
See application file for complete search history.

(56) References Cited

U.S. PATENT DOCUMENTS

| | | | | |
|---|---|---|---|---|
| 9,064,134 B1* | 6/2015 | Agarwal | ................ | G06F 21/577 |
| 10,084,809 B1* | 9/2018 | Rambo | ............. | G06F 16/24578 |
| 10,140,453 B1* | 11/2018 | Fridakis | ................ | G06F 21/577 |
| 10,469,517 B1* | 11/2019 | Higbee | ................ | H04L 63/1433 |
| 10,534,918 B1* | 1/2020 | Davidi | ................ | G06F 21/577 |
| 10,754,959 B1* | 8/2020 | Rajasooriya | ............. | G06N 7/01 |
| 11,070,582 B1* | 7/2021 | Berger | ................ | H04L 63/1433 |
| 11,153,074 B1* | 10/2021 | Nikitas | ................ | H04L 9/0897 |
| 11,271,961 B1* | 3/2022 | Berger | .................... | G06F 9/451 |
| 11,374,958 B2* | 6/2022 | Ngo | ........................ | H04L 63/10 |
| 11,681,811 B1* | 6/2023 | Dixit | ........................ | G06F 8/65 |
| | | | | 726/25 |
| 2007/0067848 A1* | 3/2007 | Gustave | ................ | G06F 21/577 |
| | | | | 726/25 |
| 2008/0163374 A1* | 7/2008 | Rogers | ................ | G06F 11/0748 |
| | | | | 726/25 |
| 2008/0189788 A1* | 8/2008 | Bahl | ................... | H04L 63/1416 |
| | | | | 726/25 |

(Continued)

Primary Examiner — Darren B Schwartz
(74) Attorney, Agent, or Firm — Fogarty LLP

(57) ABSTRACT

Systems and methods are provided for vulnerability proofing the administration of hardware components of an IHS. A proposed configuration for a hardware component of the IHS is detected. Multiple catalogs specifying known vulnerabilities of hardware components are accessed, such as a catalog of known vulnerabilities provided by a manufacturer of the hardware component and such as a catalog of known vulnerabilities provided by a manufacturer of the IHS. The proposed configuration of the hardware component is evaluated as being vulnerable in the first catalog and also in the second catalog. If the proposed configuration is identified as vulnerable in either the first catalog or in the second catalog, the hardware component is disabled until the proposed configurations for the hardware component are changed to include no configurations with vulnerabilities identified in either the first or second catalogs.

20 Claims, 5 Drawing Sheets

(56) References Cited

U.S. PATENT DOCUMENTS

| | | | |
|---|---|---|---|
| 2013/0167238 A1* | 6/2013 | Russell | H04L 63/1433 |
| | | | 726/25 |
| 2013/0239168 A1* | 9/2013 | Sreenivas | G06F 21/57 |
| | | | 726/1 |
| 2014/0331326 A1* | 11/2014 | Thakur | H04L 63/1433 |
| | | | 726/25 |
| 2017/0078322 A1* | 3/2017 | Seiver | H04L 63/1433 |
| 2017/0286689 A1* | 10/2017 | Kelley | G06F 21/577 |
| 2018/0004953 A1* | 1/2018 | Smith, II | H04L 9/3268 |
| 2018/0219908 A1* | 8/2018 | Tamir | H04L 63/1441 |
| 2018/0351987 A1* | 12/2018 | Patel | G06F 21/577 |
| 2019/0034256 A1* | 1/2019 | Fox | G06F 12/0646 |
| 2019/0166149 A1* | 5/2019 | Gerrick | G06F 21/577 |
| 2019/0238584 A1* | 8/2019 | Somasundaram | H04L 63/20 |
| 2019/0245879 A1* | 8/2019 | Ward | H04L 63/0236 |
| 2020/0050769 A1* | 2/2020 | Bhosale | G06F 16/907 |
| 2020/0162497 A1* | 5/2020 | Iyer | H04L 63/164 |
| 2020/0183677 A1* | 6/2020 | Hong | G06F 8/66 |
| 2020/0202005 A1* | 6/2020 | Wurster | G06F 9/30029 |
| 2020/0228560 A1* | 7/2020 | Murthy | G06F 8/65 |
| 2020/0272743 A1* | 8/2020 | Song | H04L 63/1433 |
| 2020/0311630 A1* | 10/2020 | Risoldi | G06F 3/0482 |
| 2020/0372156 A1* | 11/2020 | Sayyed | G06F 21/577 |
| 2021/0120028 A1* | 4/2021 | Pluderman | G06F 21/568 |
| 2021/0141906 A1* | 5/2021 | Pickren | G06F 21/577 |
| 2021/0336992 A1* | 10/2021 | Shivanna | H04L 63/20 |
| 2021/0409438 A1* | 12/2021 | Sundaram | H04L 63/20 |
| 2022/0237301 A1* | 7/2022 | Godowski | G06F 21/53 |
| 2022/0245260 A1* | 8/2022 | Priller | G06F 21/577 |
| 2023/0019180 A1* | 1/2023 | de Nijs | G06F 21/577 |
| 2023/0061121 A1* | 3/2023 | Tosevska | A61K 31/121 |
| 2023/0259633 A1* | 8/2023 | Oddo | G06F 21/577 |
| | | | 726/25 |
| 2024/0028730 A1* | 1/2024 | Munger | G06F 21/572 |
| 2024/0070290 A1* | 2/2024 | Koike | G06F 21/577 |

\* cited by examiner

SYSTEMS AND METHODS FOR AGGREGATED VULNERABILITY PROOFING OF AN IHS

FIELD

The present disclosure relates generally to Information Handling Systems (IHSs), and relates more particularly to preventing IHSs from being configured with known vulnerabilities.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. A data center may include large numbers of such racks that may be organized into rows, where the servers installed in each rack may be outwardly very similar looking, such that it may be difficult for administrators to effectively keep track of the configurations of any individual server in the data center. Moreover, administration of such large groups of servers may require teams of remote and local administrators working in shifts in order to support around-the-clock availability of the data center operations, while also minimizing any downtime.

Each server IHS within a data center may support a wide variety of possible hardware and software configurations. For instance, a server IHS may be manufactured accordingly to customized hardware and software configurations requested by a customer. In addition, upon manufacture and delivery to a customer, a received server may be provisioned for deployment according to the particular requirements of that customer. Additionally, throughout the lifetime of a server, replaceable hardware components of the server may be added, removed and repaired. Software and firmware may also be updated regularly as part of routine maintenance, to correct errors and/or to adapt the functionality of a server IHS to a specific computing task.

In some instances, these various configurations of a server IHS may themselves render the server vulnerable, even in scenarios where the configurations are intended as updates to the hardware and/or software of the server. Even though these configurations may be updated, the configurations may nonetheless be known to exhibit various types of known vulnerabilities, such as security vulnerabilities that can exploited by malicious actors and such as functional vulnerabilities that can result in errors or failures. Despite these vulnerabilities being publicly known, the administrator making the configuration changes may be unaware of these vulnerabilities, thus rendering the server configuration as vulnerable from the outset. Such issues may be exacerbated by the differing protocols and procedures that may be used in the administration of a server IHS throughout its lifetime. As different administrators configure a server according to changing policies, inconsistent configuration of the server tends to result in the server becoming increasingly vulnerable.

SUMMARY

In various embodiments, IHSs may include: one or more CPUs utilizing one or more buses that connect to a plurality of hardware components of the IHS; and a remote access controller supporting remote management of the Information Handling System (IHS), the remote access controller comprising a logic unit and a memory device having instructions stored thereon that, upon execution by the logic unit, cause the remote access controller to: detect a proposed configuration of a first of the hardware components of the IHS; access two or more catalogs specifying known vulnerabilities of hardware components, wherein a first of the catalogs comprises known vulnerabilities provided by a manufacturer of the first hardware component, wherein a second of the catalogs comprises known vulnerabilities provided by a manufacturer of the IHS; determine whether the proposed configuration of the first hardware component is identified as vulnerable in the first catalog; determine whether the proposed configuration of the first hardware component is identified as vulnerable in the second catalog; and disable the first hardware component until the proposed configurations for the first hardware component are changed to include no configurations with vulnerabilities identified in the first catalog or in the second catalog.

In some IHS embodiments, the proposed configuration further comprises a configuration of a second of the hardware components of the IHS and further comprises a configuration of a workload using the first hardware component and the second hardware component. In some IHS embodiments, execution of the instructions further causes the remote access controller to determine whether the proposed configuration of the second hardware component is identified as vulnerable in a third catalog provided by a manufacture of the second hardware component. In some IHS embodiments, execution of the instructions further causes the remote access controller to: halt the workload using the first hardware component and the second hardware component until the proposed configurations for the second hardware component are changed to include no configurations with vulnerabilities identified in the third catalog. In some IHS embodiments, execution of the instructions further causes the remote access controller to: identify one or more vulnerability proofing requirements for the IHS within a factory provisioned identity certificate of the IHS. In some IHS embodiments, the factory-provisioned identity certificate is cryptographically bound to the remote access controller of the IHS. In some IHS embodiments, the factory-provisioned identity certificate comprises digital signatures for authenticating instructions used by the first hardware component. In some IHS embodiments, the validation proofing requirements in the inventory certificate further specify the first catalog and the second catalog of known vulnerabilities for use in identifying configurations of the first hardware component that are vulnerable. In some IHS embodiments, the proposed configurations of the first hardware component comprise configurations for using specific versions of firmware in operation of the first hardware component. In some IHS embodiments, the vulnerability catalogs specify alternate firmware versions that are not associated with known vulnerabilities.

In various additional embodiments, methods are provided for vulnerability proofing the administration of hardware components of an IHS, where the vulnerability proofing is implemented by a remote access controller of the IHS that provides remote management of the IHS. The methods may include: detecting a proposed configuration of a first of the hardware components of the IHS; accessing two or more catalogs specifying known vulnerabilities of hardware components, wherein a first of the catalogs comprises known vulnerabilities provided by a manufacturer of the first hardware component, wherein a second of the catalogs comprises known vulnerabilities provided by a manufacturer of the IHS; determining whether the proposed configuration of the first hardware component is identified as vulnerable in the first catalog; determining whether the proposed configuration of the first hardware component is identified as vulnerable in the second catalog; and disable the first hardware component until the proposed configurations for the first hardware component are changed to include no configurations with vulnerabilities identified in the first catalog or in the second catalog.

In some method embodiments, the proposed configuration further comprises a configuration of a second of the hardware components of the IHS and further comprises a configuration of a workload using the first hardware component and the second hardware component. Some method embodiment may include determining whether the proposed configuration of the second hardware component is identified as vulnerable in a third catalog provided by a manufacture of the second hardware component. Some method embodiment may include halting the workload using the first hardware component and the second hardware component until the proposed configurations for the second hardware component are changed to include no configurations with vulnerabilities identified in the third catalog. Some method embodiment may include identifying one or more vulnerability proofing requirements for the IHS within a factory provisioned identity certificate of the IHS.

In various additional embodiments, remote access controllers support remote management of an IHS and may include a memory device having instructions stored thereon that, upon execution by a logic unit, cause the remote access controller to: detect a proposed configuration of a first of the hardware components of the IHS; access two or more catalogs specifying known vulnerabilities of hardware components, wherein a first of the catalogs comprises known vulnerabilities provided by a manufacturer of the first hardware component, wherein a second of the catalogs comprises known vulnerabilities provided by a manufacturer of the IHS; determine whether the proposed configuration of the first hardware component is identified as vulnerable in the first catalog; determine whether the proposed configuration of the first hardware component is identified as vulnerable in the second catalog; and disable the first hardware component until the proposed configurations for the first hardware component are changed to include no configurations with vulnerabilities identified in the first catalog or in the second catalog.

In some remote access controller embodiments, the proposed configuration further comprises a configuration of a second of the hardware components of the IHS and further comprises a configuration of a workload using the first hardware component and the second hardware component. In some embodiments, the remote access controller determines whether the proposed configuration of the second hardware component is identified as vulnerable in a third catalog provided by a manufacture of the second hardware component. In some remote access controller embodiments, execution of the instructions further causes the remote access controller to: halt the workload using the first hardware component and the second hardware component until the proposed configurations for the second hardware component are changed to include no configurations with vulnerabilities identified in the third catalog. In some remote access controller embodiments, execution of the instructions further causes the remote access controller to: identify one or more vulnerability proofing requirements for the IHS within a factory provisioned identity certificate of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
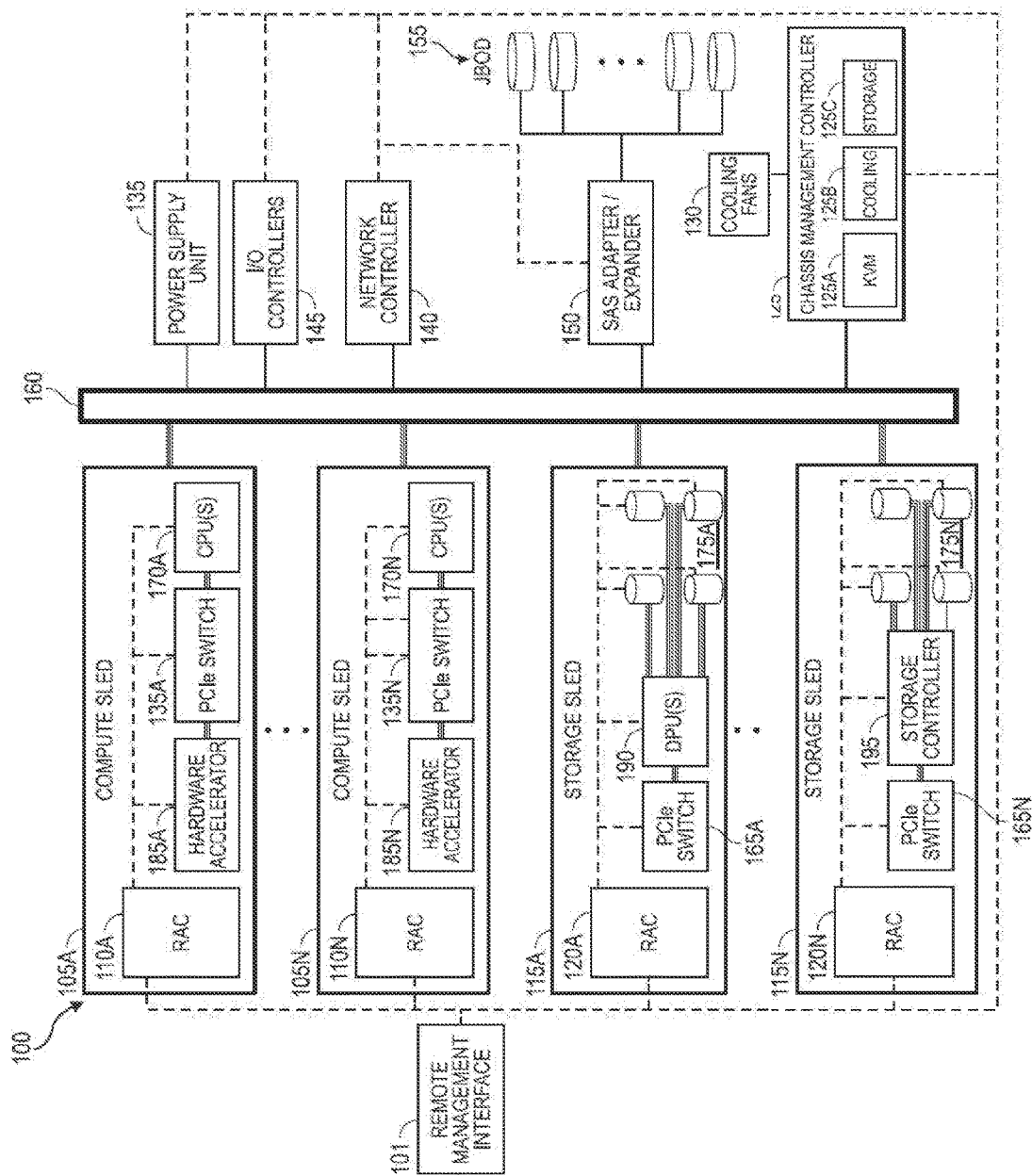
FIG. 1 is a diagram illustrating certain components of a chassis configured, according to some embodiments, for aggregated vulnerability proofing the administration of IHSs that are components of the chassis.

FIG. 1 is a block diagram illustrating certain components of a chassis 100 comprising one or more compute sled IHSs 105*a*-*n* and one or more storage sleds IHSs115*a*-*n* that may be configured to implement the systems and methods described for aggregated vulnerability proofing the administration of the IHSs 105*a*-*n*, 115*a*-*n* that are components of the chassis 100. Embodiments of chassis 100 may include a wide variety of hardware configurations in which one or more IHS 105*a*-*n*, 115*a*-*n* are installed in chassis 100. Such variations in hardware configurations may result from chassis 100 being factory assembled to include components specified by a customer that has contracted for manufacture and delivery of chassis 100.

Upon delivery and deployment of a chassis 100, the chassis 100 may be modified by replacing and/or adding various hardware components, in addition to replacement of the removeable IHSs 105*a*-*n*, 115*a*-*n* that are installed in the chassis. In addition, once the chassis 100 has been deployed, firmware and other software used by individual hardware components of the IHSs 105*a*-*n*, 115*a*-*n*, or by other hardware components of chassis 100, may be modified in order to update the operations that are supported by these hardware components. In some instances, such updates may be used to enable and disable features of an IHS and/or chassis that have been licensed for use by an owner or operator of the chassis 100, where the features that have been enabled and conditions for use of the enabled features may be set forth in a service agreement that is associated with the chassis 100.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational workloads, such as computations used in machine learning and other artificial intelligence systems, may utilize computational and/or storage resources that are shared within an IHS, within an individual chassis 100 and/or within a set of IHSs that may be spread across multiple chassis of a data center, where these shared resources may be used to form subsystems of hardware components. In one illustrative subsystem of hardware components, chassis 100 may include a hardware subsystem that includes a single compute sled 105a that is operating as part of a computing cluster with use of two storage sleds 115a and 115b, where the computing resources of compute sled 115a may include specialized artificial intelligence processors that implement machine learning systems that rely on data stored in storage sleds 115a and 115b.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100, thus forming subsystems of hardware components. For instance, computational workloads may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays).

These hardware accelerators 185a-n operate according to firmware instructions that may be occasionally updated, such as to adapt the capabilities of the respective hardware accelerators 185a-n to specific computing tasks. In some instances, firmware updates to hardware accelerators 185a-n may serve to adapt the hardware accelerator for a particular computing function, or for a particular operating environment.

Chassis 100 may be installed within a rack structure that provides at least a portion of the cooling utilized by the IHSs 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
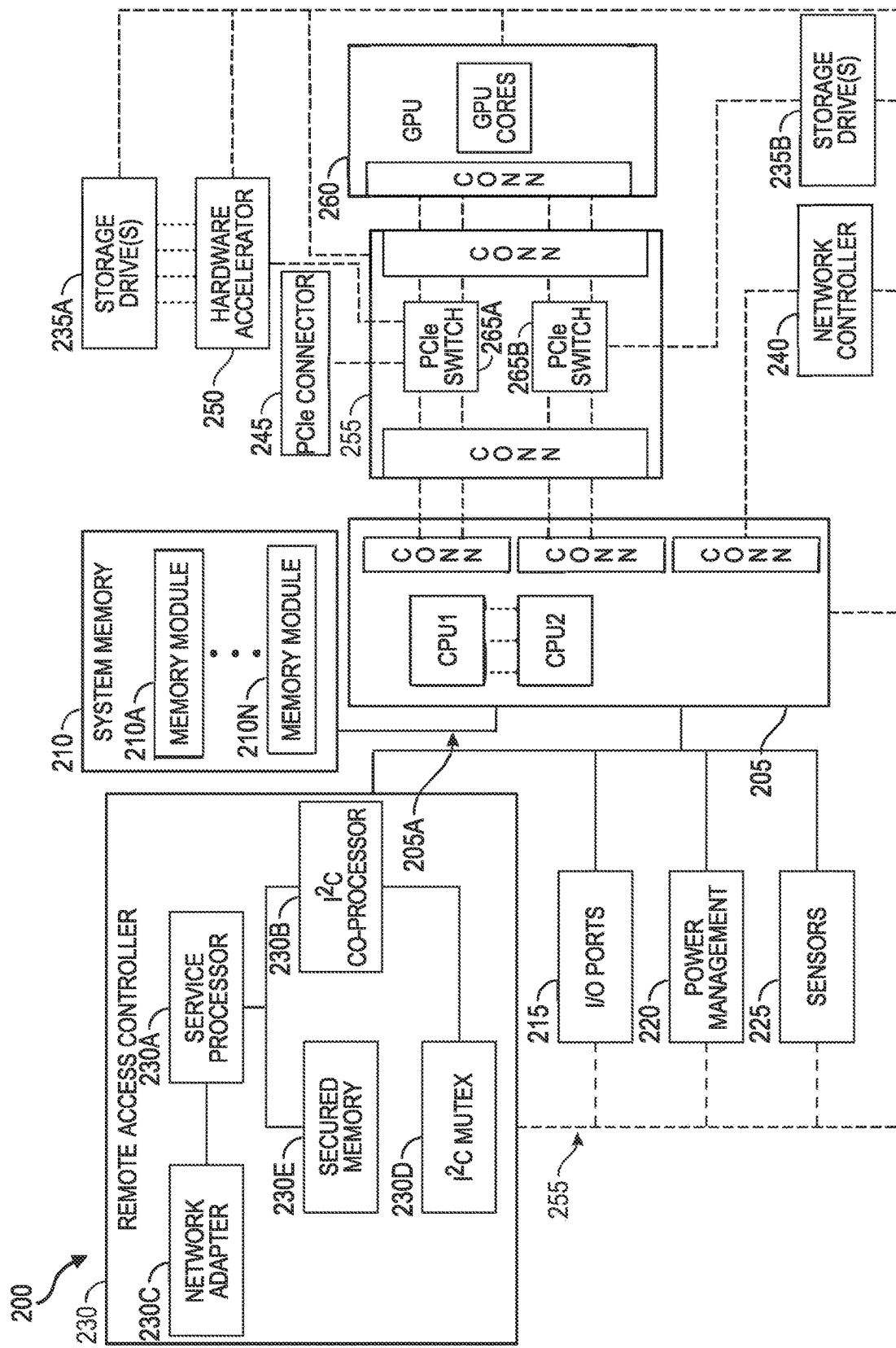
FIG. 2 is a diagram illustrating certain components of an IHS configured, according to some embodiments, for aggregated vulnerability proofing of the administration of the IHS.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business and scientific computing workloads, such as artificial intelligence systems provided via cloud computing implementations. Sleds 105a-n, 115a-n are regularly configured with hardware and software that provide leading-edge computational capabilities. Accordingly, services that are provided using such computing capabilities that are provided as high-availability systems that operate with minimum downtime.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sleds 105a-n, 115a-n. In various embodiments, these capabilities of the remote access controllers 110a-n, 120a-n may be utilized in updating the firmware or other software utilized by hardware components of chassis 100 and/or of hardware components of the sleds 110a-n, 120a-n.

As described in additional detail below, remote access controllers 110a-n, 120a-n may be configured to enforce aggregated validation proofing the administration of IHS sleds 105a-n, 115a-n that are installed in chassis 100 and/or the administration of hardware components installed in the IHS sleds. As described in additional detail below, IHSs, such as sleds 105a-n, 115a-n, may implement a wide variety of computing functions using both fixed and replaceable hardware components, such as storage drives 175a-n and hardware accelerators 185a-n. Each time one of these hardware components in an IHS 105a-n, 115a-n is administered, opportunities arise for a hardware component to be configured with known vulnerabilities, thus potentially compromising the entire chassis 100 to these vulnerabilities. In some instances, the administration of chassis 100, IHSs 105a-n, 115a-n and the internal components of the IHSs may include capabilities for validating the proposed configuration does not include configurations with known vulnerabilities. As described in additional detail below, such validations may search multiple catalogs of known software and hardware configuration vulnerabilities. In embodiments, administration of hardware components of sled IHS 105a-n, 115a-n includes vulnerability proofing of proposed hardware and software configurations, where multiple catalogs of vulnerabilities are consulted. Based on requirements that have been set forth for vulnerability proofing an IHSs 105a-n, 115a-n, embodiments determine whether to authorize use of the proposed configuration when the vulnerabilities in different catalogs are conflicting, corroborating or supplemental. Through such capabilities that may be implemented in each of the sled IHSs 105a-n, 115a-n, opportunities are mitigated for a single hardware component of one of the sleds 105a-n, 115a-n to be configured with known vulnerabilities in a manner that can result in increased vulnerability for the entire chassis 100.

In some embodiments, chassis management controller 125 may similarly utilize the aggregated vulnerability proofing using multiple catalogs of vulnerabilities described herein in order to ensure configurations used in the administration of chassis 100 do not include known vulnerabilities. In some instances, sleds 105a-n, 115a-n, network controller 140, power supply 135 and various other components of chassis 100 may be replaceable. In some embodiments, chassis management controller 125 may utilized the vulnerability proofing described herein in the administration of such replaceable components that are installed in chassis. The chassis management controller 125 may thus implement vulnerability proofing for a compute sled 105a as part of its installation in chassis 100 and as a condition of its use in a computing cluster that includes other compute sleds 105b-n and/or storage sleds 115a-n, where the aggregated vulnerability proofing ensures that the administration of compute sled 105a accurately accounts for hardware or software configurations with known vulnerabilities that are identified from multiple different catalogs of vulnerabilities.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the software and hardware installed in the chassis 100. For example, remote management interface 101 may provide capabilities by which an administrator can initiate updates to the firmware utilized by all of the storage drives 175a-n installed in a chassis 100, or to the firmware utilized by all of the storage drives 175a-n of a particular model or manufacturer. In some instances, remote management interface 101 may include an inventory of the hardware, software and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, that may be programmed and adapted for specific computing workloads, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated, such as to adapt these programmable components for operation within different subsystems of hardware components.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n, thus operating as a subsystem of interdependent components that may be proofed for vulnerabilities as described herein.

As illustrated, a storage sled 115a may include one or more DPUs (Data Processing Units) 190 that provide access to and manage the operations of the storage drives 175a of the storage sled 115a, thus operating as a subsystem of interdependent components that may be proofed for vulnerabilities as described herein. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be in integrated component of a DPU 190. The data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195, thus operating as a subsystem of interdependent components that may be proofed for vulnerabilities using the aggregated methodologies described herein. In some instances, storage controller 195 may provide support for RAID (Redundant Array of Independent Disks) configurations of logical and physical storage drives, such as storage drives provided by storage sled 115n, thus operating as a subsystem of interdependent components that may be proofed for vulnerabilities. In some instances, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100, thus operating as a subsystem of components that may be proofed for vulnerabilities as described herein. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed to support specific computing workloads, and operating as a subsystem of components that may be proofed for vulnerabilities as described herein. In some instances, a chassis 100 may include numerous storage drives 175a-n, 155 that are identical, or nearly identical, such as arrays of SSDs of the same manufacturer and model. Accordingly, any updates or other administration of storage drives 175a-n, 155 requires the updates to be applied within each of these topologies being supported by the chassis 100. Despite the large number of different storage drive topologies that may be supported by an individual chassis 100, the firmware or other software used by each of these storage devices 175a-n, 155 may be occasionally updated.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated, such as to enable and disable features supported by the network controller.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated, such as to adapt the power supply unit for operation according to different modes of operation.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated, such as to adapt the I/O controller 140 for operation with different external systems. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for aggregated vulnerability proofing the administration of IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1 RU server installed within a 2 RU chassis, that is configured to share infrastructure resources provided within a chassis 100.

IHS 200 may utilize one or more system processors 205, that may be referred to as CPUs (Central Processing Units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or other component that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. In some embodiments, each of the PCIe switches 265a-b may be a replaceable expansion card or other component that is coupled to a connector of IHS 200. Each of the PCIe switches 265a-b may operate according to firmware instructions that may be occasionally updated.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated. In some embodiments, each of the storage drives 235a-b may be replaceable components that are coupled to a connector of IHS 200.

As illustrated, PCIe switch 265a is coupled via a PCIe link to a hardware accelerator 250, such as a DPU, SmartNIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250a-b may include MIPS (microprocessor without interlocked pipeline stages) cores, RISC-V cores, or CISC (complex instruction set computing) (i.e., x86) cores. Each programmable hardware accelerator 250 may operate according to firmware or other instructions that may be occasionally updated.

In the illustrated embodiment, the programmable capabilities of hardware accelerator 250 implements functions used to support replaceable storage drives 235a, such as SSDs, where such configurations form subsystems of interdependent components that may be proofed for vulnerabilities as described herein. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support high-speed operation of these storage drives, and in some cases may be used to provide high-availability and high-throughput implementations of the read, write and other I/O operations that are supported by these storage drives 235a.

In other embodiments the include subsystems of interdependent components that may be proofed for vulnerabilities as described herein, hardware accelerator 250 may implement operations in support of other types of devices and may similarly support high-bandwidth PCIe connections with these devices. For instance, in various supported workloads, hardware accelerator 250 may support high-bandwidth connections, such as PCIe connections, with networking devices in implementing functions of a network switch, compression and codec functions, virtualization operations or cryptographic functions. In some instances, updates to firmware utilized by hardware accelerators 250 may enable and disable features supported by the hardware accelerators 250.

As illustrated in FIG. 2, PCIe switches 265a-b may also support PCIe couplings with one or more GPUs (Graphics Processing Units) 260, also forming subsystems of interdependent components that may be proofed for vulnerabilities as described herein. Embodiments may include one or more GPU cards, where each GPU card is coupled to one or more of the PCIe switches 265a-b, and where each replaceable GPU card may include one or more GPUs 260. In some embodiments, PCIe switches 265a-b may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some workloads, GPUs may be utilized as programmable computing resources for offloading other functions from CPUs 205, in the same manner as hardware accelerator 250. Accordingly, GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to the IHS. Through couplings to PCIe connectors 245a, a variety of removeable data storage devices, graphics processors and network interface cards may be coupled to IHS 200, thus supporting a wide variety of topologies of devices that may be removably coupled to the IHS 200, and where such collection of devices of IHS may form subsystems of interdependent components that may be proofed for vulnerabilities.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for aggregated validation proofing the administration of IHS 200, may operate using validated instructions, and thus within the root of trust of IHS 200.

Using these validated instructions, during administration of a hardware and software of the IHS 200, remote access controller 230 evaluates the proposed configurations for the administration against multiple catalogs of known hardware vulnerabilities, such as specific firmware versions that have been replaced due to security flaws or functional errors and specific hardware configuration with known functional vulnerabilities. Before allowing the proposed configurations, the remote access controller 230 verifies whether the configurations would introduce vulnerabilities. As described in additional detail below, catalogs that list known vulnerabilities may be provided by various different entities, such as the manufacture of the IHS, the manufacturer of individual hardware components installed in an IHS and third parties contracted to provide technical support and/or maintenance of an IHS.

In embodiments, remote accessed controller 230 is utilized to factory provision IHS 200 with an inventory certificate that specified instructions for using these various catalogs in vulnerability proofing the IHS. In particular, the remote access controller 230 uses the inventory certificate instructions to determine how to interpret conflicting, corroborating and supplemental vulnerability information identified in different catalogs that are used in the vulnerability proofing. If a requisite combination of vulnerabilities in the proposed configurations are identified in the different catalogs, remote access controller 230 may halt further administration or use of a hardware component being administered, thus preventing a hardware component from being configured with known vulnerabilities.

In some embodiments, remote access controller 230 may include a service processor 230a, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b. For instance, remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an I2C co-processor 230b of the remote access controller 230.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
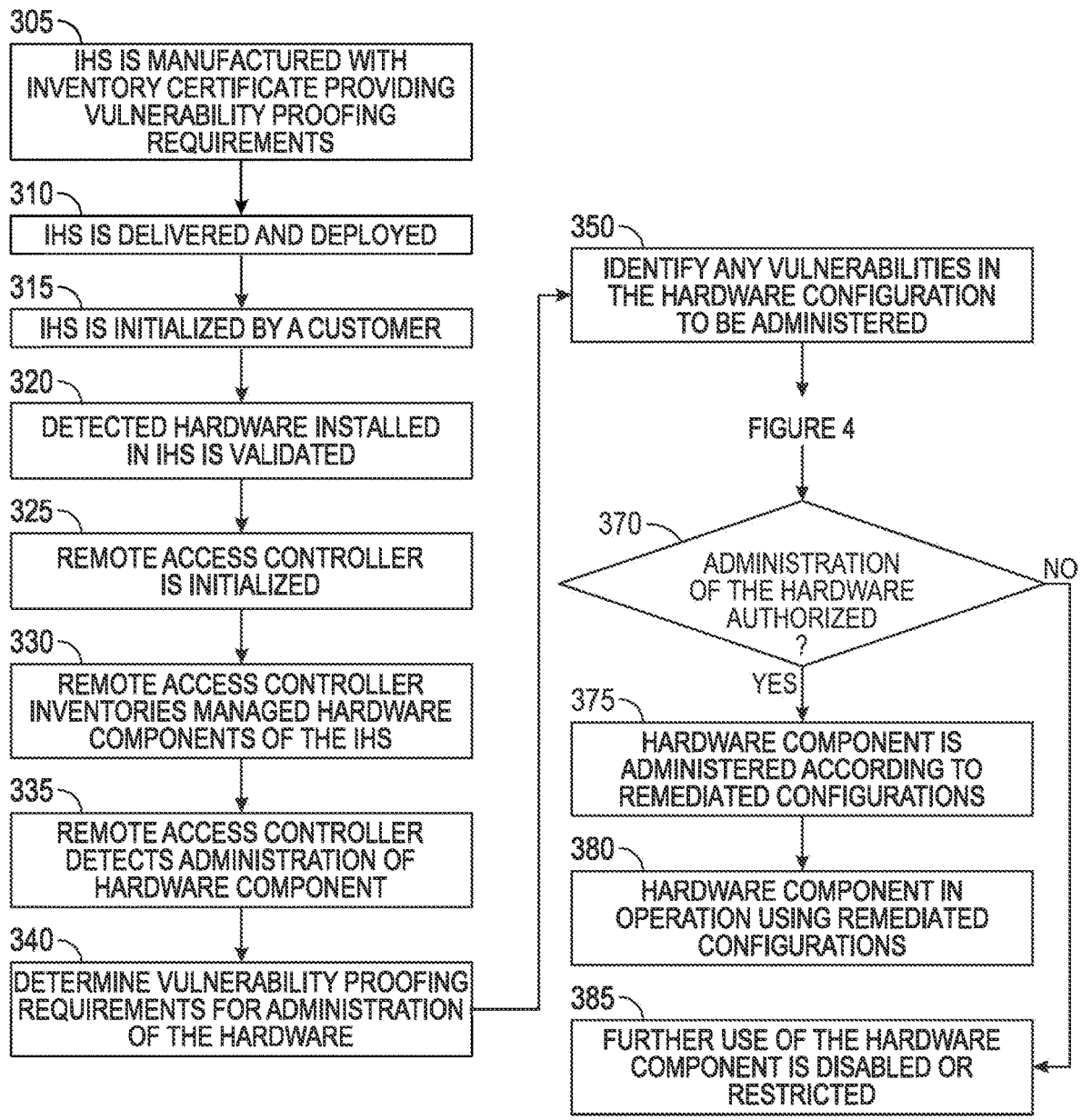
FIG. 3 is a flow chart diagram illustrating certain steps of methods, according to some embodiments, for aggregated vulnerability proofing of the administration of an IHS.

FIG. 3 is a flow chart diagram illustrating certain steps of methods, according to some embodiments, for aggregated vulnerability proofing of the administration of an IHS, such as the IHSs described with regard to FIGS. 1 and 2. Some embodiments of the method of FIG. 3 may begin, at block 305, with the factory assembly and provisioned of an IHS, such as a server IHS described with regard to FIGS. 1 and 2, where the IHS is factory provisioned to implement aggregated vulnerability proofing procedures for determining the vulnerabilities for a hardware component based on information in multiple catalogs of known vulnerabilities, in order to prevent the configuration of an IHS and/or its hardware components with known vulnerabilities.

In some instances, an IHS may be manufactured using a factory process that includes multiple phases of assembly, validation and provisioning that must be completed before the IHS is shipped to a customer. As described, an IHS such as a server may be purpose-built for a particular customer such that the server is assembled and provisioned according to specifications provided by the customer, such as including subsystems of hardware components adapted to specific computing functions. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components and subsystems that have been requested by a specific customer that has contracted for the assembly and delivery of an IHS. For example, a customer request an IHS with a specific subsystem of hardware components installed, where each of the hardware components in the requested subsystem configuration operates using a specific firmware version.

Once the assembly of an IHS has been completed, the IHS may be subjected to manual and automated inspections that confirm the IHS has been properly assembled and does not include any defects. After confirming an IHS has been assembled without any manufacturing defects, factory provisioning of the IHS may be initiated. In some instances, the provisioning of an IHS at the factory may include various stages that may include stages for loading of firmware, configuring hardware components, and installing an operating system and other software. Various different aspects of this factory provisioning process may be conducted using a factory provisioning application, where this factory provisioning application may run on one or more servers and may interface with an IHS that is being provisioned once a requisite amount of firmware and software has been installed to the IHS.

A manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. In some embodiments, the generated manifest may also specify subsystems of installed hardware components, such as the subsystems described with regard to FIGS. 1 and 2. The manifest generated during assembly of an IHS is provided to the factory provisioning application that will being used to provision the assembled IHS, which includes installing firmware and other software on the IHS.

As part of the this factory provisioning, one or more firmware versions and associated firmware settings may be loaded for use by various hardware components of the IHS. In some embodiments, the one or more firmware versions that are loaded for use by each hardware component during factory provisioning may be determined based on a service agreement or other configuration for the IHS that was selected by a customer as part of the purchase of the IHS. Once the set of firmware versions for each of the hardware components of the IHS has been selected, the factory provisioning application may confirm the authenticity and integrity of the selected firmware versions based on digital signatures provided by hardware component manufacturers or other entities providing the firmware. The manifest of the IHS may then be updated to identify the firmware versions that are supported by each of the managed hardware components of IHS and may also be updated to include digital signatures associated with each of the supported firmware versions. In this manner, the factory-provisioning system may upload one or more supported firmware versions to at least some of the factory-installed hardware components of an IHS.

Based on the hardware inventory and firmware version information that is specified in the manifest of the IHS, the factory provisioning application may initiate the generation of an identity certificate that may be used to validate the detected hardware components of the IHS as the same hardware components that were installed during the factory assembly of the IHS. In addition, in some embodiments, an identity certificate may be further factory provisioned to also include vulnerability proofing instructions for use in the administration of hardware components of the IHS, and in particular instructions for aggregated vulnerability proofing based on multiple catalogs of vulnerabilities. Once the IHS has been delivered, the inventory certificate may then be used to validate the authenticity of the detected hardware and software of an IHS, and to further validate the vulnerability proofing instructions in the inventory certificate, which may then be used in confidence to ensure that the administration of hardware components installed in an IHS does not introduce known vulnerabilities that may compromise a hardware component, and potentially may also compromise the IHS.

As described with regard to FIGS. 1 and 2, an IHS may include a remote access controller that provides capabilities for remote management of an IHS, where these remote management capabilities may include sideband management of various managed hardware components of an IHS. In some embodiments, the generation of an inventory certificate, including vulnerability proofing instructions, for a newly assembled IHS may be initiated via a request from the factory provisioning application to the remote access controller of the IHS. As described with regard to FIG. 2, a remote access controller of an IHS may include cryptographic capabilities that operate within the root of trust of the IHS and that may include the ability to generate cryptographic keypairs. Utilizing such cryptographic capabilities, the remote access controller initiates the creation of an inventory certificate by generating a cryptographic key pair for use in validating the authenticity of inventory information and for authenticating the vulnerability proofing instructions included in the inventory certificate.

In some embodiments, the remote access controller generates a certificate signing request (CSR) for the generation of a digital identity certificate, where the request specifies the public key of the key pair generated by the remote access controller, and also specifies the factory installed hardware inventory from the manifest that was generated during assembly of the IHS, and also specifies an inventory of the authorized firmware for one or more of the managed hardware components of the IHS, and also specifies vulnerability proofing instructions for the administration of the IHS and for the use of risk scores in administration of the IHS. The factory installed and provisioned hardware and firmware inventory information and vulnerability proofing instructions that are included in the CSRs may be signed by the remote access controller using the private key from the generated keypair. The CSR for the requested identity certificate may then be transmitted to the factory provisioning application.

The factory provisioning application may submit the CSR for signing by a factory certificate authority. Upon receipt of the CSR, the factory certificate authority may parse from the CSR: the hardware inventory information, the inventory of authorized firmware for the managed hardware components of the IHS, the vulnerability proofing instructions, the public key generated by the remote access controller and the information specifying a requested signing key. Based on the information parsed from the CSRs, the factory certificate authority generates a digital identity certificate, referred to herein as an inventory certificate, that is associated with the public key provided by the remote access controller and that specifies the factory installed hardware inventory of the IHS and vulnerability proofing instructions for the use multiple catalogs of vulnerabilities.

The factory certificate authority may submit the generated inventory certificate for signing by a hardware security module that may be a dedicated hardware component of a factory provisioning server that safeguards cryptographic keys and implements cryptographic functions utilized in the factory provisioning process. The hardware security module digitally signs the submitted inventory certificate, which is then returned to the factory provisioning application. In some embodiments, the factory provisioning application may retain a copy of the signed certificate. In some instances, copies of the inventory and device certificate may be retained to reference data store utilized in providing ongoing support of the IHS once it has been shipped and has been deployed by a customer, such as in issuing updated certificates for an IHS in response to changes to the IHS that result in changes to the authorized hardware and/or software supported by the IHS, and in response to changes in vulnerability proofing requirements that are based on multiple catalogs of vulnerabilities.

The signed inventory certificate may then be loaded to the assembled IHS as part of the factory provisioning of the IHS. In some embodiments, the signed inventory certificate may be uploaded to a secured memory of the remote access controller, such as described with regard to FIG. 2. With the generation and transfer of the signed identity certificate completed, additional factory provisioning of the assembled IHS may be completed and, at 310, the assembled IHS is shipped from the factory to a customer. The IHS may be received at a data center and may be further provisioned for deployment within the data center.

Once a received IHS has been provisioned for operation within a datacenter, at 315, the IHS is initialized. As part of the initialization of the IHS, various procedures may be implemented for validating the authenticity of the hardware components of the IHS. As described, an IHS may be factory provisioned to include an inventory certificate that specifies the factory installed hardware components of the IHS. At 320, such a factory-provisioned inventory certificate may be utilized to validate the hardware components detected during initialization of the IHS. Each detected hardware component is identified by the IHS and the hardware component may be initialized only if its detected identity matches a hardware identity specified in the factory provisioned inventory certificate. In this same manner, the factory-provisioned firmware for these hardware components may also be validated against one or more firmware identities specified in the inventory certificate.

One of the hardware components that may be validated in this manner is a remote access controller of an IHS, where both the identity of the remote access controller and the firmware instructions loaded for use by the remote access controller may be validated based on the signed inventory certificate. At 325, these validated instructions may be used in initializing the remote access controller. Once initialized, at 330, the remote access controller collects an inventory of the detected managed hardware components of the IHS, including of the subsystems of hardware components that are being configured. As described with regard to FIG. 2, a remote access controller may utilize various inband and sideband buses in providing remote management of an IHS and of certain individual hardware components of the IHS. Utilizing these capabilities, the initialized remote access controller may detect each of the managed hardware components that have been successfully validated and initialized.

Once the remote access controller and other hardware of the IHS have been validated as authentic and operating using authentic instructions, the IHS is fully initialized, such as booting of an operating system and other user applications. Once in operation, the IHS may operate for any period of time before, at 335, a hardware component, a subsystem of hardware components and/or a software system of the IHS is administered. Once the administration of a hardware component has been detected by the remote access controller, some embodiments may halt all further operation of the hardware component, and in some instances of subsystems that include the hardware component, until vulnerability proofing of the hardware component configuration has been completed. In some embodiments, the remote access controller may interrogate the hardware component being administered and/or a remote management interface for information such as firmware versions to be loaded and configurations for the hardware component.

In administering an IHS, an administrator may select a profile for configuring the IHS, such as profile specifying firmware to be loaded for use by a hardware component of the IHS and also specifying various other settings and configurations for the hardware component. In some instances, an administrator may utilize an existing profile for administering hardware and/or software of an IHS. For example, rather than define a new profile from scratch for administering a hardware component, an administrator may identify a previously used profile used to update a similar hardware component, where the profile can also be used, possibly with some changes, to update the hardware component being administered. As a known profile is used repeatedly in this manner for updating hardware components, some profiles are relied upon as "golden" configurations that have been used successfully and are thus trusted by the administrator. However, such reliance on use of existing profiles may result in the hardware components being configured from the outset with known vulnerabilities.

By utilizing an existing profile in the administration of hardware component, an administrator may be unaware that configurations included in the profile may have known vulnerabilities. For example, a profile may specify use of a particular firmware version by a network controller that is installed in the IHS, but an administrator may be unaware that a security vulnerability has been identified in this particular firmware version. Unless the administrator actively investigates whether any vulnerabilities have been identified in the configurations of an existing profile that is being used to administer the hardware component, and unless the administrator addresses any identified vulnerabilities, the hardware component will be configured at the outset of its administration with known vulnerabilities.

At 340, embodiments may continue with the remote access controller determining vulnerability proofing requirements for the administration of the IHS, and for the use of multiple catalogs of vulnerabilities in this administration. As described above, in some embodiments, vulnerability proofing instructions for the administration of hardware components of an IHS may be specified within a factory provisioned inventory certificate. For instance, an inventory certificate may specify that the administration of hardware components installed in an IHS must not introduce known vulnerabilities, and may further specify that when multiple catalogs are consulted, the identification of a vulnerability in any of these catalogs is sufficient to initiate procedures for remediating the proposed configurations, or in halting the proposed administration all together. In another example, an inventory certificate may specify that configurations of certain types of hardware components installed in an IHS must result in administration of the component in a manner that does not include known vulnerabilities, with the identification of a vulnerability in two or more catalogs required to trigger remediation of the proposed configuration and/or halting of the hardware component. In another example, an inventory certificate may specify that certain types of hardware components must be proofed for certain types of known vulnerabilities, such as a requirement that hardware accelerators of the IHS must be configured without introducing known security vulnerabilities that are listed in a trusted security catalog, in light of the use of the hardware accelerators in implementing a cryptographic security protocol used to secure communications by the IHS. In this manner, the vulnerability proofing instructions included in an inventory certificate may limit the administration of a hardware component in configurations with known security vulnerabilities, but these limitation used in the administration of the hardware component may allow configurations to proceed with identified functional vulnerabilities, such as an known software bugs that are not exploitable as security loopholes, such as a bug that results in a graphics controller using non-calibrated display settings that distort color outputs of a display monitor.

In some embodiments, the vulnerability proofing instructions included in an inventory certificate may specify multiple catalogs of vulnerabilities that must be checked when evaluating the proposed configurations for known vulnerabilities, and may include instructions on collating the vulnerability information that is identified in different catalogs. In this manner, embodiments may allow the use of any number of catalogs in evaluating configurations of an IHS for known vulnerabilities. For instance, in an IHS that includes a GPU that includes cores that are programmed to interoperate with a PCIe switch and a set of storage drives to form a high-performance signal processing subsystem, the vulnerability proofing instructions in the inventory certificate may specify that catalogs provided by the manufacturer of the GPU, catalogs provided by the manufacturer(s) of the storage drives and catalogs provided by the manufacturer of the IHS must be searched for known vulnerabilities in order to configure this particular subsystem, due to the high-availability and high-priority nature of this GPU configuration. In this manner, embodiments may provide particularized validation proofing requirements and resources for the administration of individual hardware components of an IHS.

In some embodiments, the inventory certificate may also specify one or more catalogs of known vulnerabilities that are to be consulted during the administration of a hardware component. In some embodiments, the inventory certificate may specify types of vulnerabilities that are to evaluated when administering a hardware component, and responses to the different types of vulnerabilities. Utilizing these capabilities provided by embodiments, a customer that manages a large number of IHSs may specify requirements for vulnerability proofing each of the managed IHSs using catalogs of known vulnerabilities that are controlled by the customer and that are securely stored by the individual IHSs. Updating the catalogs that are evaluated for vulnerability proofing the administration of hardware components cannot be circumvented without a factory provisioned update to the inventory certificate that specifies the catalogs that must be investigated for known vulnerabilities. In this manner, datacenter administrators can be assured that hardware component subsystems, or at least certain types of subsystems, are not configured for operation with known vulnerabilities, and thus cannot be used to introduce known vulnerabilities that could impact the entire datacenter.

Figure 4:
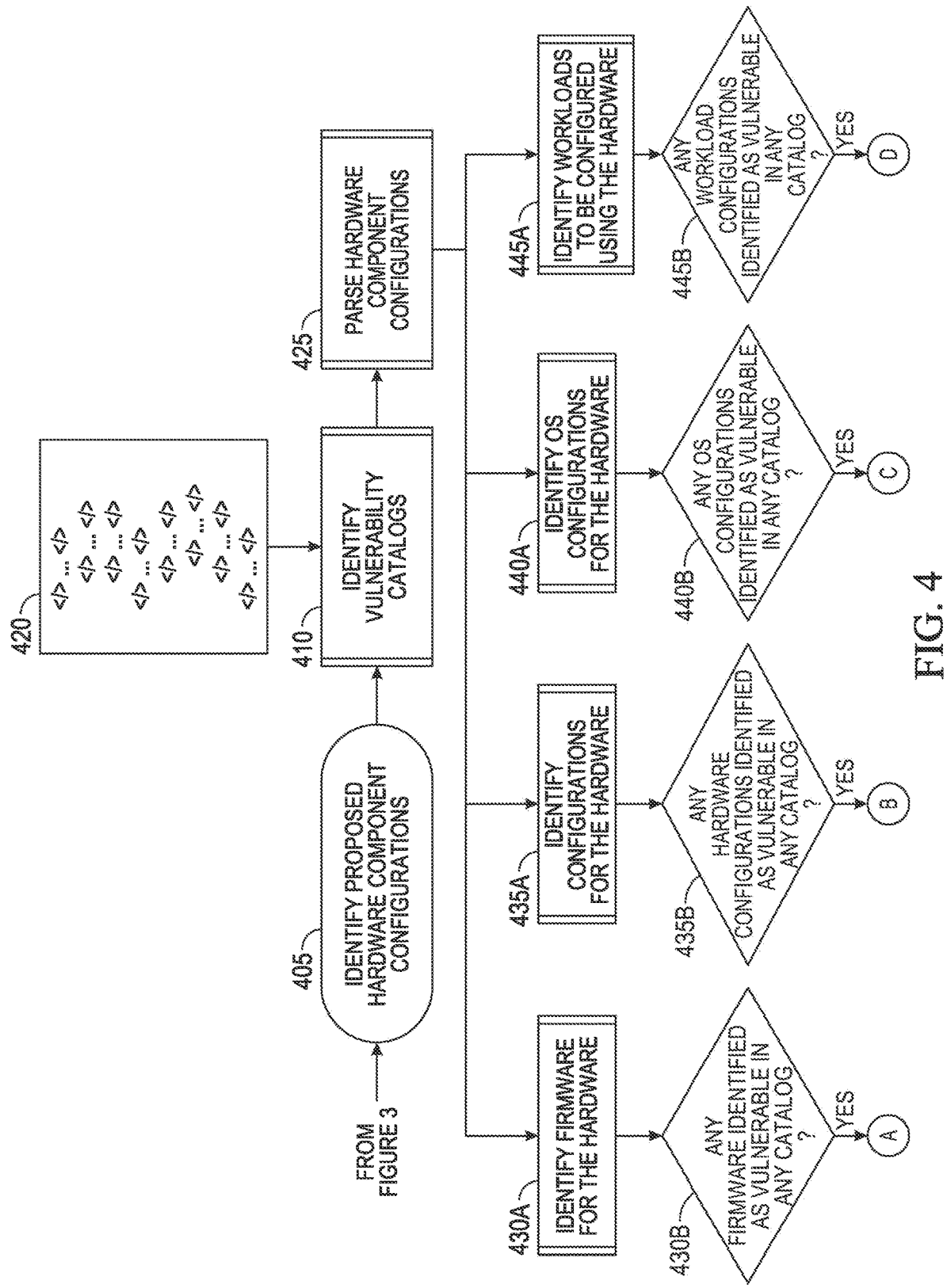
FIG. 4 is a flow chart diagram illustrating certain additional steps of methods, according to some embodiments, for aggregated vulnerability proofing the administration of an IHS.
Figure 4:
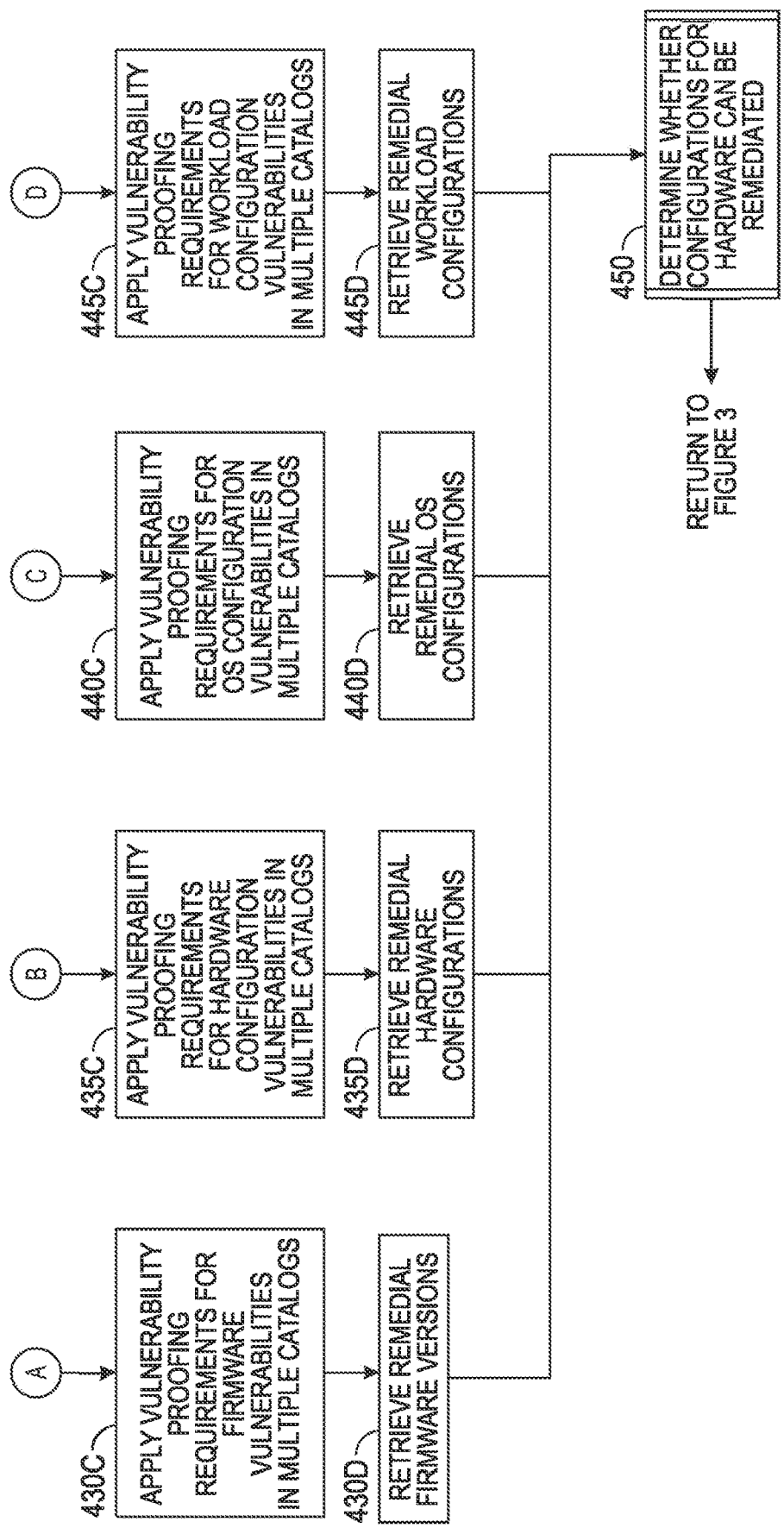

Once the vulnerability proofing requirements for the administration of a hardware component of the IHS have been identified, at 350, the remote access controller determines whether any of the proposed configurations for the hardware component include known vulnerabilities. FIG. 4 is a flow chart diagram illustrating certain additional steps of methods, according to some embodiments, for further aggregated vulnerability proofing of the administration of hardware components of an IHS. Embodiments of FIG. 4 may begin, at 405, with the identification of the configurations that have been selected for use in the administration of a hardware component. The configurations may specify versions of firmware to be installed for use by the hardware component, configurations to be made to the hardware component itself, any configurations to the operating system and/or configurations to support use of a hardware component in a specific workload.

At 410, the remote access controller identifies two or more catalogs 420 of known vulnerabilities, that may include hardware, software and/or workload configurations with known vulnerabilities. A catalog may be any collection of structured data, such as a database, data structure or a file, such as an XML file. A catalog is intended to be generally available to the public and is intended as available to data center administrators. One or more different entities may generate and maintain catalogs 420 specifying known vulnerabilities of hardware and/or software components that may be installed in an IHS. For instance, the manufacturer of an IHS may maintain one or more catalogs specifying known vulnerabilities identified in IHS models sold by the manufacturer, known vulnerabilities of factory installed hardware components of IHSs sold by the manufacturer, known vulnerabilities in hardware and/or software configurations supported by these hardware components and known vulnerabilities in workload configurations supported by IHSs sold by the manufacturer. Similar catalogs 420 of known vulnerabilities may be maintained by other entities, such as third parties that publish known security vulnerabilities that have been identified in products sold by various different manufacturers. In some instances, catalogs 420 of known vulnerabilities may be maintained by entities contracted to provide technical support for an IHS or for a network of IHSs, such as for one or more data centers. In some instances, catalogs 420 of known vulnerabilities may be maintained by hardware component manufacturers, such as a manufacturer of network controllers that maintains a catalog of vulnerabilities that have been identified in its supported products.

As described, an IHS may be factory provisioned with an inventory certificate that specifies vulnerability proofing instructions for the administration of the IHS, and also specifies validation proofing instructions for collating vulnerability information identified in multiple catalogs, where the validity of this catalog information included in the inventory certificate can be confirmed based on the digital signatures included in the inventory certificate. In some embodiments, the catalogs that are used in identifying known vulnerabilities in hardware components may be supplemented through the generation of an updated inventory certificate that adds to or otherwise modifies the catalogs that must be searched for vulnerabilities by the vulnerability proofing procedures implemented by the remote access controller. For instance, based on a hardware component being shipped to a customer for installation in an IHS, the inventory certificate of that IHS may be updated to specify an additional catalog that must be consulted when validation proofing the administration of hardware components installed in the IHS. In this example, the new catalog may be supported by a manufacturer of the new hardware component that is being shipped for installation in the IHS. In this manner, the inventory certificate may be used to configure vulnerability proofing on an individual IHS such that the IHS is provided with the best known sources of vulnerability information for an IHS. In another example, the inventory certificate of an IHS may be updated upon a workload configuration of the IHS that results in creation of a component subsystem, such as the GPU system described above, in which validation proofing of the subsystem now requires inspection of additional catalogs, such as catalogs maintained by a group providing technical support group for the operation of the workload.

Despite the existence of such vulnerability catalogs, their use is not enforced within existing procedures for administering hardware component of an IHS, thus providing the described opportunity for an IHS to be administered at the outset with known vulnerabilities. Even if consulting such catalogs of known vulnerabilities is technically a required step in manual administration of an IHS, such requirements cannot be readily enforced. Moreover, even when an administrator attempts to consult the vulnerability catalogs, the highly tedious task of determining whether any of the proposed hardware or software configurations for an IHS are present in any of the available vulnerability catalogs is an error-prone task. Additionally, such vulnerability catalogs may be updated at any time, thus requiring an administrator to repeat a complete search for vulnerabilities for each and every administration of an IHS. Despite the difficulty of enforcing the use of these vulnerability catalogs, such catalogs are still an effective way of disseminating information specifying known hardware and software vulnerabilities to a wide array of customers.

Embodiments may continue, at 425, with the parsing of hardware and software configurations to be applied based on the administration of the IHS. As illustrated in FIG. 4, the parsed configuration information may be evaluated against the known vulnerabilities specified in the vulnerability catalogs. From the parsed configuration information, at 430a, the remote access controller identifies versions of firmware to be installed for use by a hardware component of the IHS based on the administration. For instance, the administration of an FPGA card installed in an IHS may include selection of firmware for use in reprogramming the FPGA for use in specific machine learning computations, such as in implementing and training neural networks. In some instances, this configuration of the FPGA may include configuration of the FPGA along with a set of storage drives as part of a subsystem of components used to implement a machine learning system. At 430b, the remote access controller determines whether this particular version of firmware to be configured for use by the FPGA has been associated with any known vulnerabilities that are specified in any of the two or more catalogs that are being consulted as part of the vulnerability proofing of the administration of the FPGA. If no vulnerabilities are identified in any of the catalogs, configuration of the FPGA using the proposed firmware proceeds using the proposed configuration.

However, as indicated in FIG. 4, if multiple vulnerabilities are identified for the proposed configuration, at 430c, the remote access controller consults the vulnerability proofing requirements in order to determine how to collate the multiple vulnerabilities that have been identified. In some embodiments, the vulnerability proofing requirements may specify collating of vulnerabilities where identical vulnerabilities (i.e., the same vulnerability for a configuration) are treated as redundant information. On the other hand, some vulnerability proofing requirements may specify that identical vulnerabilities are treated additively, such that two identical vulnerabilities in separate catalogs are treated as two separate vulnerabilities that prevent a configuration from being used. In some embodiments, the vulnerability proofing requirements may specify collating of vulnerabilities such that multiple instances of non-redundant vulnerabilities (i.e., different vulnerabilities, for the same or different component) may also be treated as additive, such that any two identified vulnerabilities identified in any of the catalogs prevents a configuration from being used.

With the vulnerabilities in the catalogs identified, at 430d, the remote access controller determines whether any remediation procedures are available, such as using a different version of the firmware that can be used for similarly programming the FPGA to support the machine learning computations. In some instances, the remediation procedures available for addressing known vulnerabilities may themselves also be specified within the vulnerability catalogs. For instance, the vulnerability catalog entry that specifies the vulnerability in the selected FPGA firmware may specify an upgraded version of the firmware that patches a discovered security vulnerability, or may specify a downgraded version of the firmware that functions adequately and avoids a security vulnerability in the most recent version of the firmware.

In some embodiments, the use of an remediation procedures that modify the proposed configuration may include issuing a notification to an administrator that has proposed the configuration, such as via a graphical interface of the remote management interface being used by the administrator. In some embodiments, the administrator may be notified of the identified vulnerabilities in the proposed configuration and may be further notified of the remediation procedures that have been identified and confirmed as available for use by the IHS. In some embodiments, the administrator may be asked to confirm the amendments to the configurations to be used in the administration the IHS. In scenarios where no remediation procedures are available or are insufficient based on the vulnerability proofing requirements set forth in the inventory certificate, the administrator may be notified of the vulnerabilities that have been identified and the catalog entries corresponding to each vulnerability.

Also from the parsed configuration information, at 435a, the remote access controller identifies any proposed configurations of hardware components of the IHS. For instance, administration of a storage controller installed in an IHS may include configuring the storage controller for operation within a specific storage cluster subsystem that is operating within a data center, such as configuration of the storage controller as a part of a cluster of servers implementing a RAID storage subsystem. At 435b, the remote access controller determines whether this RAID configuration when used by this particular storage controller has been associated with any known vulnerabilities that are specified in any of the catalogs that are being consulted as part of the vulnerability proofing. If no vulnerabilities are identified, configuration of the hardware component using the proposed configurations with no adjustments made the proposed configuration.

However, as indicated in FIG. 4, if multiple vulnerabilities are identified in the catalogs, at 435c, the remote access controller uses the vulnerability proofing instructions in the inventory certificate of the IHS to determine how to collate the multiple vulnerabilities. For instance, the inventory certificate may specify that in the RAID storage system, catalogs maintained by the manufacturer of the storage drives and catalogs maintained by the storage controller manufacturer are to be investigated for vulnerabilities if any components of the storage system are re-configured. Moreover, the vulnerability proofing requirements may specify that the identification of a vulnerability in any one of these catalogs is sufficient to preclude use of the proposed configuration. If vulnerabilities have been identified, at 435d, the remote access controller determines whether any remediation procedures are available, such as using an alternate hardware configuration, where the available remediation procedures may also be specified within the vulnerability catalogs. For instance, the vulnerability catalog entry that specifies a vulnerability in use of level 1 RAID configuration with a particular type of storage controller may specify an alternative use of level 2 RAID configurations that avoid a discovered error in level 1 configurations.

Also from the parsed configuration information, at 440a, the remote access controller identifies any operating system configurations to be made in the administration of the IHS. For instance, use of certain graphics functions supported by a GPU installed in the IHS may require use of a particular version of an operating system on the IHS. Accordingly, the proposed configurations for the GPU may include a configuration that upgrades the operating system of the IHS to a new version. At 440b, the remote access controller determines whether this operating system version or any of the operating system setting have been associated with any known vulnerabilities that are specified in any of the catalogs that are being consulted as part of the vulnerability proofing. If no vulnerabilities are identified, configuration of the operating system settings specified in the profile for the hardware component may proceed.

However, as indicated in FIG. 4, if multiple vulnerabilities are identified in the catalogs, at 435c, the remote access controller uses the vulnerability proofing instructions in the inventory certificate of the IHS to determine how to collate the multiple vulnerabilities. For instance, the vulnerability proofing instructions may specify that catalogs maintained by the operating system developer and catalogs of the GPU manufacturer must be investigated for vulnerabilities and that a vulnerability identified in the operating system catalog is insufficient to block a configuration, unless it is corroborated by any related or unrelated vulnerability that is identified in the GPU catalog. If any vulnerabilities are identified, at 440d, the remote access controller determines whether any remediation procedures available, such as using a still newer upgraded operating system version that addresses issues in the version specified in the profile, where the available remediation procedures may also be specified within the vulnerability catalogs.

Also from the parsed configuration information, at 445a, the remote access controller identifies any workload configurations to be made as part of the administration of the IHS. For instance, administration of a hardware accelerator installed in an IHS may include configurations for use of the hardware accelerator for machine learning workloads, such as training neural networks used in machine vision. At 445b, the remote access controller determines whether any of the configurations that are part of this workload configuration have been associated with any known vulnerabilities that are specified in any of the catalogs that are being consulted as part of the vulnerability proofing. If no vulnerabilities are identified, administration of the hardware component for use in the workload specified in the profile may proceed with no adjustments made to the proposed configuration.

However, as indicated in FIG. 4, if multiple vulnerabilities are identified in the catalogs, at 445c, the remote access controller uses the vulnerability proofing instructions in the inventory certificate of the IHS to determine how to collate the multiple vulnerabilities. For instance, the vulnerability proofing instructions may specify the use of catalogs maintained by an entity providing technical support for a workload and may also specify the use of catalogs maintained by the manufactures of components used in the hardware accelerator configuration used to operate the workload. In some embodiments, the vulnerability proofing instructions specify that the a single vulnerability in the catalog maintained by the workload technical support entity is sufficient to block use of a proposed configuration, but only security vulnerabilities from the catalogs of the component manufacturers are sufficient to block a proposed configuration. If any vulnerabilities are identified, at 445d, the remote access controller determines whether any remediation procedures are available, such as a different machine learning configuration that utilizes different hardware accelerator settings or different storage drive settings, where the available remediation procedures may also be specified within the vulnerability catalogs.

As indicated in FIG. 4, at 450, embodiments may confirm that the proposed configurations for administering the hardware component can be remediated using the remediation procedures specified in the vulnerability catalogs. In some embodiments, the remote access controller determines whether any restrictions may prevent adaptation of the proposed configurations using the identified remediation procedures. In some instances, applicable service agreements may preclude use of a particular remediation procedure. For example, an applicable service agreement for the IHS may authorize use of only certain RAID configuration levels, even though a storage controller may support a wider range of RAID configurations. In such a scenario, embodiments may determine that remediation procedures that include use of a non-authorized RAID configuration are not available for use on the IHS. In another example, embodiments may determine that a remediation procedure specifying an upgrade to firmware used by a PCIe switch would render the PCIe switch as non-compatible with the GPU that is coupled to the PCIe switch as part of a subsystem of hardware components of an IHS, but does not yet support this upgraded firmware of the PCIe switch.

As indicated, upon remediation of the proposed configuration in a manner that addresses vulnerabilities identified in the configuration, embodiments return to FIG. 3 in continued administration of the IHS using the proposed configuration. Embodiments may continue, at 370, in determining whether the proposed configurations are allowed based on the available remediation procedures, the identified vulnerabilities and the vulnerability proofing requirements from the inventory certificate. Administration of the IHS may continue, at 375, using the proposed configurations. Once the administration of the IHS has been completed, at 380, the IHS is deployed and put back into service within the data center.

By preemptively addressing known vulnerabilities in the proposed configuration, once the IHS has been administered using this configuration, the IHS is ready for immediate use. In existing tools, an IHS may be administered without addressing known vulnerabilities. Once the IHS is redeployed, various tools may be used to identify and address vulnerabilities in the IHS. However, if the IHS is deployed with known vulnerabilities, opportunities are provided for these vulnerabilities to be exploited before they are actually addressed. Additionally, deferring remediation of the vulnerabilities until an IHS has been deployed will result in the IHS being taken back out of service to address the vulnerabilities, thus immediately reducing its availability. Embodiments thus provide capabilities by which an IHS may be administered in a manner that preemptively addresses all known vulnerabilities in the hardware and software configurations that are proposed in the administration.

As indicated, in scenarios where the identified vulnerabilities in the IHS subsystem cannot be remediated, at 385, further use of a hardware component or subsystem being administered disabled, or at least restricted. In some instances, repeated attempts may be made to identify available remediation procedures that can used to address identified vulnerabilities and that are available for use on the IHS. In disabling hardware components, in some embodiments, the remote access controller may suspend bus communications by the hardware components included in the proposed configuration for all buses that are mastered or are otherwise controllable by the remote access controller, such as the described sideband management busses. Additionally or alternatively, the remote access controller may notify the processors, TPM, BIOS, operating system of the untrusted state of the hardware components that are being administered in a manner that includes known vulnerabilities. Based on such notifications, all remaining bus communications by the hardware components are disabled. In some embodiments, these capabilities of the remote access controller and of the remote management interface may be used to halt workloads that are operating using the hardware component that is being configured with known vulnerabilities. For instance, in a workload that operates using a hardware accelerator coupled in a subsystem with multiple storage drives, the identifies of vulnerabilities in proposed configurations for the hardware accelerator or for any of these storage drives may result in the workload being halted until both of these components are configured without vulnerabilities.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
one or more CPUs utilizing one or more buses that connect to a plurality of hardware components of the IHS; and
a remote access controller supporting remote management of the Information Handling System (IHS), the remote access controller comprising a logic unit and a memory device having instructions stored thereon that, upon execution by the logic unit, cause the remote access controller to:
detect a proposed configuration of a first of the hardware components of the IHS,
access two or more catalogs specifying known vulnerabilities of hardware components, wherein a first of the catalogs comprises known vulnerabilities provided by a manufacturer of the first hardware component, wherein a second of the catalogs comprises known vulnerabilities provided by a manufacturer of the IHS;
determine whether the proposed configuration of the first hardware component is identified as vulnerable in the first catalog;
determine whether the proposed configuration of the first hardware component is identified as vulnerable in the second catalog; and
disable the first hardware component until the proposed configurations for the first hardware component are changed to include no configurations with vulnerabilities identified in the first catalog or in the second catalog.

2. The IHS of claim 1, wherein the proposed configuration further comprises a configuration of a second of the hardware components of the IHS and further comprises a configuration of a workload using the first hardware component and the second hardware component.

3. The IHS of claim 2, wherein execution of the instructions further causes the remote access controller to determine whether the proposed configuration of the second hardware component is identified as vulnerable in a third catalog provided by a manufacture of the second hardware component.

4. The IHS of claim 3, wherein execution of the instructions further causes the remote access controller to halt the workload using the first hardware component and the second hardware component until the proposed configurations for the second hardware component are changed to include no configurations with vulnerabilities identified in the third catalog and until the proposed configurations for the first hardware component are changed to include no configurations with vulnerabilities identified in the first catalog or in the second catalog.

5. The IHS of claim 1, wherein execution of the instructions further causes the remote access controller to identify one or more vulnerability proofing requirements for the IHS within a factory provisioned identity certificate of the IHS.

6. The IHS of claim 5, wherein the factory-provisioned identity certificate is cryptographically bound to the remote access controller of the IHS.

7. The IHS of claim 5, wherein the factory-provisioned identity certificate comprises digital signatures for authenticating instructions used by the first hardware component.

8. The IHS of claim 5, wherein the validation proofing requirements in the inventory certificate further specify the first catalog and the second catalog of known vulnerabilities for use in identifying configurations of the first hardware component that are vulnerable.

9. The IHS of claim 1, wherein the proposed configurations of the first hardware component comprise configurations for using specific versions of firmware in operation of the first hardware component.

10. The IHS of claim 9, wherein the vulnerability catalogs specify alternate firmware versions that are not associated with known vulnerabilities.

11. A method for vulnerability proofing the administration of hardware components of an IHS (Information Handling System), wherein the vulnerability proofing is implemented by a remote access controller of the IHS that provides remote management of the IHS, the method comprising:
    detecting a proposed configuration of a first of the hardware components of the IHS;
    accessing two or more catalogs specifying known vulnerabilities of hardware components, wherein a first of the catalogs comprises known vulnerabilities provided by a manufacturer of the first hardware component, wherein a second of the catalogs comprises known vulnerabilities provided by a manufacturer of the IHS;
    determining whether the proposed configuration of the first hardware component is identified as vulnerable in the first catalog;
    determining whether the proposed configuration of the first hardware component is identified as vulnerable in the second catalog; and
    disable the first hardware component until the proposed configurations for the first hardware component are changed to include no configurations with vulnerabilities identified in the first catalog or in the second catalog.

12. The method of claim 11, wherein the proposed configuration further comprises a configuration of a second of the hardware components of the IHS and further comprises a configuration of a workload using the first hardware component and the second hardware component.

13. The method of claim 12, further comprising determining whether the proposed configuration of the second hardware component is identified as vulnerable in a third catalog provided by a manufacture of the second hardware component.

14. The method of claim 13, further comprising halting the workload using the first hardware component and the second hardware component until the proposed configurations for the second hardware component are changed to include no configurations with vulnerabilities identified in the third catalog.

15. The method of claim 11, further comprising identifying one or more vulnerability proofing requirements for the IHS within a factory provisioned identity certificate of the IHS.

16. A remote access controller supporting remote management of an Information Handling System (IHS), the remote access controller comprising a memory device having instructions stored thereon that, upon execution by a logic unit, cause the remote access controller to:
    detect a proposed configuration of a first of the hardware components of the IHS;
    access two or more catalogs specifying known vulnerabilities of hardware components, wherein a first of the catalogs comprises known vulnerabilities provided by a manufacturer of the first hardware component, wherein a second of the catalogs comprises known vulnerabilities provided by a manufacturer of the IHS;
    determine whether the proposed configuration of the first hardware component is identified as vulnerable in the first catalog;
    determine whether the proposed configuration of the first hardware component is identified as vulnerable in the second catalog; and
    disable the first hardware component until the proposed configurations for the first hardware component are changed to include no configurations with vulnerabilities identified in the first catalog or in the second catalog.

17. The remote access controller of claim 16, wherein the proposed configuration further comprises a configuration of a second of the hardware components of the IHS and further comprises a configuration of a workload using the first hardware component and the second hardware component.

18. The remote access controller of claim 17, determine whether the proposed configuration of the second hardware component is identified as vulnerable in a third catalog provided by a manufacture of the second hardware component.

19. The remote access controller of claim 18, wherein execution of the instructions further causes the remote access controller to:
    halt the workload using the first hardware component and the second hardware component until the proposed configurations for the second hardware component are changed to include no configurations with vulnerabilities identified in the third catalog.

20. The remote access controller of claim 16, wherein execution of the instructions further causes the remote access controller to:

identify one or more vulnerability proofing requirements for the IHS within a factory provisioned identity certificate of the IHS.

\* \* \* \* \*